J. OSTRANDER.
YIELDABLE PACKING.
APPLICATION FILED APR. 5, 1919.
1,381,931.
Patented June 21, 1921.
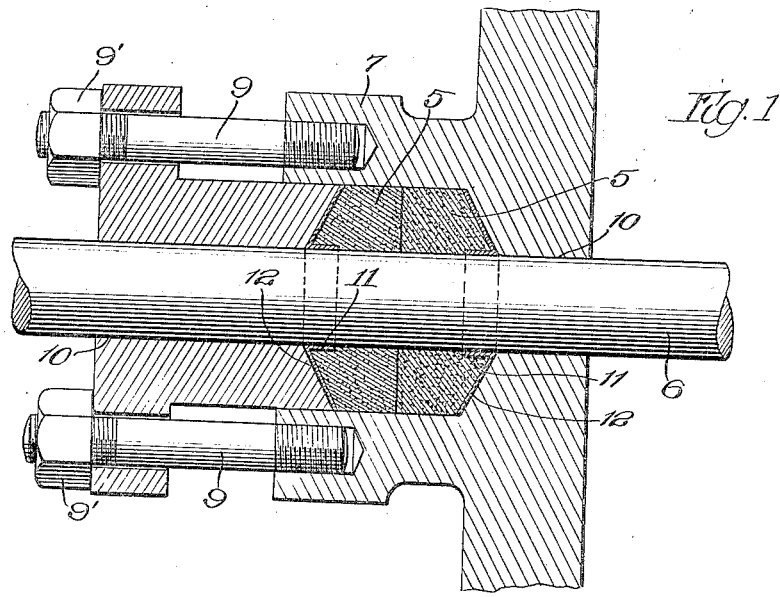
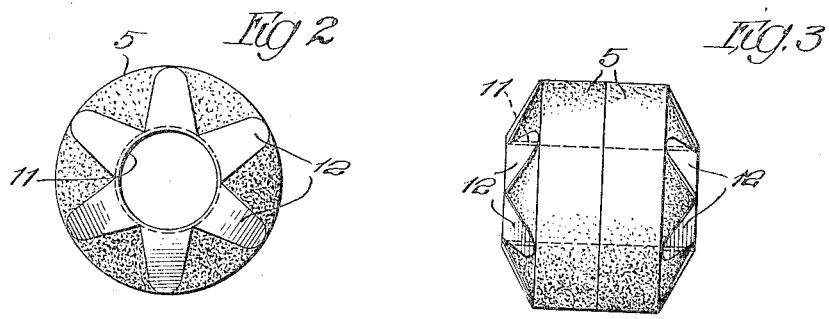
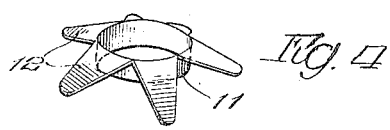
Inventor
James Ostrander
By Jones Addington Ames & Seibold
Attys

UNITED STATES PATENT OFFICE.

JAMES OSTRANDER, OF INDIANAPOLIS, INDIANA, ASSIGNOR TO GRAPHO-METAL PACKING COMPANY, OF INDIANAPOLIS, INDIANA, A CORPORATION.

YIELDABLE PACKING.

1,381,931.   Specification of Letters Patent.   Patented June 21, 1921.

Application filed April 5, 1919. Serial No. 287,919.

*To all whom it may concern:*

Be it known that I, JAMES OSTRANDER, a citizen of the United States, residing at Indianapolis, in the county of Marion and State of Indiana, have invented new and useful Improvements in Yieldable Packings, of which the following is a full, clear, concise, and exact description, reference being had to the accompanying drawing, forming a part of this specification.

My invention relates to improvements in yieldable packings of the type in which the packing is formed of a readily yieldable or flexible granular substance, such as a composition of pulverized graphite.

The object of my invention is the provision of means designed for use, especially in connection with packings of the character mentioned, which will prevent the packing, when in use, from being crowded out through the stuffing box housing in which the packing is used. A further object is the production of means, as mentioned, which will protect the packing in shipment so as to guard against marring or mutilation of the end of the packing.

A still further object is the production of a packing retainer which will be of durable and economical construction, and which may be readily and easily applied. Other objects will appear hereinafter.

With these objects in view, the invention consists in the combinations and arrangements of parts hereinafter described and claimed.

The invention will be best understood by reference to the accompanying drawings forming a part of this specification, and in which—

Figure 1 is a central section through a packing and stuffing box therefor equipped with packing retainers embodying the invention.

Fig. 2 is an end view of the packing removed and with the retainer arranged in operative relation therewith.

Fig. 3 is a side view of the construction seen in Fig. 2.

Fig. 4 is a perspective view of the retainer detached.

The preferred form of construction, as illustrated in the drawings, is shown applied to annular resilient or flexible packing members 5 of the type above referred to. Said packing members 5 are arranged about a shaft or rotary element 6, and are inclosed in a stuffing box or housing of conventional construction, which consists of a stationary element 7, and an adjustable element 8, the parts being connected together by bolts 9 and coöperating nuts 9'. The said stuffing box at each side of the packing chamber therein is formed with a reduced opening or bearing portion 10 for the shaft 6.

It has been found that in the use of a packing of the character referred to, especially where the openings 10 in the stuffing box are worn, or for any reason are to any appreciable extent larger than a shaft, that there is a tendency for the packing, because of the yieldable nature thereof, to crush or crowd through said openings and spin out on the shaft. Much of the packing was thus wasted, and to guard against this wastage, retaining members have been provided, adapted to fit over the outer sides or ends of the packing members. The retaining members devised for this purpose comprise an annular portion 5, adapted to fit snugly in the end of the packing member, and a plurality of radially extending arms or leaves 12 adapted to extend over and lie against the end surface of the packing. With this arrangement it will be seen that the end of the packing around the shaft or rotating element will be guarded or inclosed so as to positively prevent any of the packing being crowded into the opening or throat of the stuffing box. The retaining member is formed of a soft, pliant material, such as Babbitt metal which will not score or otherwise wear on the shaft. The arms or leaves 12 are formed integral with the annular portion 11, and may be readily bent or flexed to a position in which they conform with the disposition of the end surface of the packing engaged thereby.

A retaining member of the character described is also of special advantage in shipping of the packing members, inasmuch as a protection is thus afforded to the ends of the packing members so as to prevent injury thereto in transit or before being applied for use.

Having thus described my invention, what I claim as new and desire to secure by Letters Patent is:

1. The combination with a cylindrical element, of a yieldable packing therefor; a housing for said packing having a restricted opening through which said element extends; and annular means fitting between the packing and the shaft for preventing crowding thereof into said opening.

2. The combination with a movable element, of a yieldable packing therefor; a housing for packing; means embracing one end of said packing for retaining the same in said housing, said means comprising an annular portion fitting between the said packing and the shaft; and a yieldable portion extending over the end surface of said packing.

3. The combination with a movable element, of a yieldable packing therefor; a housing for said packing; means embracing one end of said packing for retaining the same on said housing, said means comprising an annular portion fitting between said packing and the shaft; and a yieldable portion connected with said annular portion and extending over the end surface of said packing.

4. The combination with a movable element, of a yieldable packing therefor; a housing for said packing; means embracing one end of said packing for retaining the same in said housing, said means comprising an annular portion fitting between said packing and the shaft; and a plurality of radial portions extending over the end surface of said packing.

5. The combination with a movable element, of a yieldable packing therefor; a housing for said packing; means embracing one end of said packing for retaining the same in said housing, said means comprising an annular portion fitting between said packing and the shaft; and a plurality of radial portions connected with said annular portion and extending over the end surface of said packing.

6. The combination with an annular yieldable packing, of a retainer embracing one end thereof comprising an annular portion fitting between the packing and the shaft; and a portion extending outwardly from said annular portion over the end surface of the packing.

7. The combination with an annular yieldable packing, of a retainer embracing one end thereof comprising an annular portion fitting between the packing and the shaft; and a plurality of radial portions extending outwardly from said annular portions over the end surface of the packing.

8. The combination with an annular yieldable packing, of a retainer embracing one end thereof comprising an annular portion fitting between the packing and the shaft; and a plurality of radial portions extending outwardly from said annular portion over the end surface of the packing.

In witness whereof, I have hereunto subscribed my name.

JAMES OSTRANDER.

Witnesses:
ALBERT M. BRISTOR,
CHAS. W. HABIG.